United States Patent [19]
Bailey

[11] 3,901,687
[45] Aug. 26, 1975

[54] PROCESS FOR THE SELECTIVE CONTROL OF WEEDS IN KENTUCKY BLUEGRASS

[75] Inventor: Richard Elton Bailey, Plain City, Ohio

[73] Assignee: O. M. Scott and Sons Company, Marysville, Ohio

[22] Filed: Aug. 31, 1973

[21] Appl. No.: 393,606

[52] U.S. Cl............................................... 71/120;
[51] Int. Cl.[2].......................................... A01N 9/20
[58] Field of Search........ ............................... 71/120

[56] References Cited
UNITED STATES PATENTS

| | | | |
|---|---|---|---|
| 3,079,244 | 2/1963 | Scherer et al......................... | 71/120 |
| 3,497,541 | 2/1970 | Martin et al.......................... | 71/120 |
| 3,692,911 | 9/1972 | Martin et al.......................... | 71/120 |

OTHER PUBLICATIONS

Kerr, "Grass Control with Siduron," (1969), CA 71, No. 12006K, (1969).

*Primary Examiner*—Glennon H. Hollrah
*Attorney, Agent, or Firm*—J. B. Raden; H. J. Holt

[57] ABSTRACT

A process for the selective control of weeds, including annual bluegrass, in mature Kentucky bluegrass comprising treating the turf with certain substituted phenylurea compounds such as 3-(3,4-dichlorophenyl)-1-methoxy-1-methylurea.

8 Claims, No Drawings

PROCESS FOR THE SELECTIVE CONTROL OF WEEDS IN KENTUCKY BLUEGRASS

This invention relates to a process for the selective control of weeds in Kentucky bluegrass and particularly to the control of annual bluegrass in established Kentucky bluegrass.

*Poa annua*, thought to have originated along the northern Mediterranean shores, has so profusely disseminated that today it is commonly found throughout the world in intensely managed turf. Known as annual bluegrass, wintergrass, annual meadowgrass and by its scientific name *Poa annua*, it is considered the dominant, most difficult to control weed species in well maintained turf. This in part results from its genetic similarity to the desirable perennial Kentucky bluegrass species. Annual bluegrass differs from perennial Kentucky bluegrass (*Poa pratensis*) in a number of characteristics: near complete absence of rhizomes, bunch type growth habit, light green color, continuous flowering/seedhead production, susceptibility to drought, persistence under extremely low cut (¼ inch) and irrigated conditions, and prolific growth under cool, moist environment. Numerous cultural and chemical approaches have been attempted for the control of annual bluegrass. To date no completely effective and safe method or practice is known for its control.

There are reports in the literature of the evaluation of a number of pre-emergence herbicides for controlling annual bluegrass in Kentucky bluegrass turf. The reports indicate that several of the herbicides tested have achieved some success for pre-emergence annual bluegrass control. However, they have had either very erratic, or no effect on seedlings or mature plants of annual bluegrass which complete their life cycle to reinfest during the same or following season. Additionally, they fail to effectively control mature annual bluegrass plants which under certain conditions act as perennial types. Thus complete pre-emergence control of annual bluegrass is not possible.

Numerous post-emergence compounds have undergone evaluation for selective annual bluegrass removal in established turf. These materials have either been ineffective for post-emergence annual bluegrass control or have had insufficient Kentucky bluegrass tolerance.

Linuron is a known herbicide. It, and a number of related chemical compounds and their use as a herbicide are the subject of U.S. Pat. Nos. 2,960,534 and 3,079,244. Linuron is known as a selective herbicide for controlling germinating and newly established dicot and monocot weeds in crops such as soybeans, cotton, corn, wheat, potatoes, carrots and parsnips. Linuron has not been considered effective on perennial weed species. It has been reported to be non-selective on bent and fescue turfs - completely killing annual bluegrass, bent and fescues at all rates tested. It is commercially sold for the control of weeds in crops with specific instructions that it not be used on lawns.

There is therefore no presently known method of effectively controlling annual bluegrass in established Kentucky bluegrass turf.

It is accordingly a primary object of the present invention to provide an effective process for the selective control of annual bluegrass in established Kentucky bluegrass turf.

It is an additional object of this invention to provide a process for the selective control of a variety of weeds in addition to annual bluegrass in established Kentucky bluegrass.

It is still an additional object of this invention to provide a process for the selective control in established Kentucky bluegrass of certain perennial weeds which have hitherto not been successfully controlled.

It has now been discovered that linuron and certain linuron related compounds are effective for the selective pre- and post-emergence control of annual bluegrass in established Kentucky bluegrass turf. This discovery is surprising, not only because of the many hitherto unsuccessful efforts to selectively control annual bluegrass, but also because of the widespread belief prior to the present discovery, that linuron, and linuron-type chemical compounds, were toxic to Kentucky bluegrass. In addition, as shown in greater detail below, other closely related compounds are not effective. Moreover, the compounds useful in the invention are toxic to a number of species of desirable turf other than bluegrass, even at low application rates and they are also toxic to germinating seeds and seedlings of Kentucky bluegrass.

While the invention is particularly effective for the post-emergence selective control of annual bluegrass, it is also useful for the pre- and post-emergence selective control of a number of other turf weeds species, including several for which there have been no commercially acceptable selective control available. In its broadest aspect therefore, the invention is directed to a process for the selective control of both monocot and dicot weeds in mature Kentucky bluegrass comprising treating the bluegrass with a compound of the formula

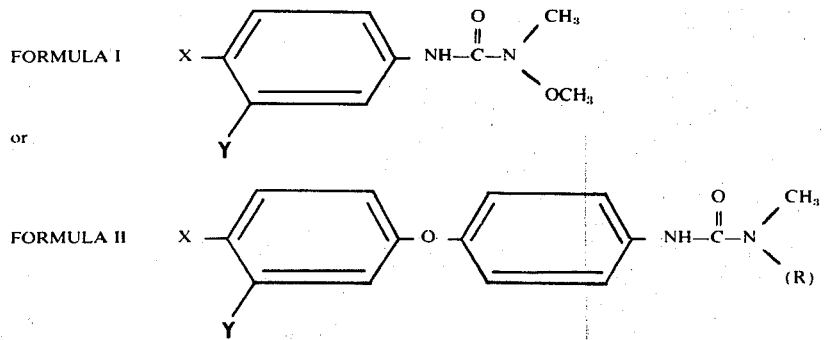

wherein X is chlorine or bromine, Y is chlorine, bromine or hydrogen and R is methyl or methoxy, in an amount effective to kill the weeds but insufficient to damage the bluegrass.

A preferred group of compounds included within Formulas I and II are linuron itself, 3-(3,4-dichlorophenyl)-1-methoxy-1-methylurea; chlorbromuron, 3-(4-bromo-3-chlorophenyl)-1-methoxy-1- methylurea; metobromuron, 3-(4-bromophenyl)-1-methoxy-1-methylurea; monolinuron, 3-(4-chlorophenyl)-1-methoxy-1-methylurea; and chloroxuron, 4-(4-(4-chorophenoxy)phenyl)-1-1-dimethylurea. Additional useful compounds are those in which both X and Y are bromine in Formula I; and compounds in which either or both X and Y are bromine in Formula II, and R is methyl. It is also of course possible to use mixtures of the foregoing compounds.

The invention has been found useful for the pre- and post-emergence control of a number of both monocot and dicot weed species. Monocot species which are selectively controlled in turf include the following, identified by both their common and scientific names:

| Barnyardgrass | (Echinochloa crusgalli) |
|---|---|
| Bentgrass | (Agrostis sp.) |
| Crabgrass | (Digitaria sp.) |
| Foxtail | (Setaria sp.) |
| Goosegrass | (Eleusine indica) |
| Nimblewill | (Muhlenbergia schreberi) |
| Fall Panicum | (Panicum sp.) |
| Annual Bluegrass | (Poa annua) |
| Rough Bluegrass | (Poa trivialis) |
| Quackgrass | (Agropyron repens) |

Dicot weed species in turf which are selectively controlled include the following:

| Buckhorn Plantain | (Plantago lanceolata) |
|---|---|
| Chickweed 1/ | (Cerastium sp. & Stellaria sp.) |
| Clover | (Trifolium sp.) |
| Dandelion | (Taraxacum officinale) |
| Pigweed | (Amaranthus sp.) |
| Purslane | (Portulaca sp. & Richardia sp.) |

1/ Controlled by pre-emergence application only.

It should be particularly noted that nimblewill, bentgrass, rough bluegrass and quackgrass, included in the above list of monocot species, act as perennial weeds in established Kentucky bluegrass turf. Such perennial weed species have hitherto not been successfully controlled with commercially available herbicides. Moreover, commercial literature on linuron specifically states that it will not control established perennials. Certain of the weeds in the above list may under certain conditions be deemed desirable plants. The term "weed" as used herein is intended to identify plants which are unwanted in Kentucky bluegrass turf. This is in accord with the definition set forth in "Principles of Plant and Animal Pest Control," Vol. 2, entitled Weed Control, National Academy of Sciences, 1968, pg. 1.

The unobvious nature of the invention is believed, in part, to be based upon an unexpected difference in activity between greenhouse and field behavior of the compounds useful in the invention when applied to Kentucky bluegrass. This difference, illustrated in the specific examples below, is not shared by closely related chemical compounds. A possible explanation for this difference in behavior is that the compounds undergo chemical modification in the presence of ultra violet light, screened out in a greenhouse, which render them non-toxic to Kentucky bluegrass.

The rate at which the herbicide is used will depend on the particular compound, the type of formulation in which it is incorporated and the characteristics of the area to which it is applied. Single application rates of from ½ to as high as 16 pounds per acre effectively control weeds with minimal or no turfgrass injury. Repeat applications may be used at rates below the single application rates. Normally the rate of application will vary from 1 to 8 pounds per acre and a preferred rate is from 3 to 4½ pounds per acre. A typical formulation is one in granular form containing 3.6% linuron on a corncob carrier for application at 4.5 pounds per acre rate.

The following examples illustrate the practice of the present invention.

EXAMPLE 1

This example compares the activity of closely related substituted urea compounds monuron, diuron and linuron under greenhouse conditions. The foliar spray in this and subsequent examples was prepared by mixing the herbicidal compound with water to produce 40 gallons of spray per acre. To this was added a surfactant, at the rate of 0.5% volume per volume of spray. The surfactant was that sold by duPont under the trademark Surfactant WK. The principal functioning agent of the surfactant is dodecyl ether of polyethylene glycol.

Table I shows a comparison of post-emergence foliar spray applications of linuron, diuron and monuron on Kentucky and annual bluegrass species under greenhouse conditions.

| Compound | Rate (LB/A) | % Kill Kentucky Bluegrass | Annual Bluegrass |
|---|---|---|---|
| Monuron | 0.5 | 83 | 95 |
|  | 2 | 100 | 100 |
|  | 8 | 100 | 100 |
| Diuron | 0.5 | 100 | 100 |
|  | 2 | 100 | 100 |
|  | 8 | 100 | 100 |
| Linuron | 0.5 | 0 | 43 |
|  | 2 | 95 | 99 |
|  | 8 | 100 | 100 |

Each material demonstrates highly toxic non-selective post-emergence responses to both annual and Kentucky bluegrass species at 2 and 8 lbs/A rates. Chemical structures of each compound are as follows:

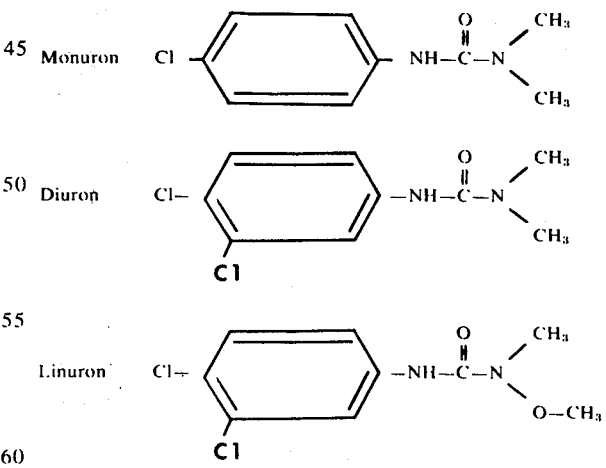

It will be noted that monuron and diuron differ from compounds of Formula I only in the presence of methyl rather than a methoxy group on the urea nitrogen. On the basis of structural similarities and comparable greenhouse response patterns, parallel activity would be suggested for these chemical compounds applied in field environment.

EXAMPLE 2

This example compares the tolerance of Kentucky bluegrass to linuron and diuron when applied post-emergence under field conditions. Table II shows a comparison of the effects of post-emergence foliar spray applications of linuron and diuron, prepared as in Example 1, on Kentucky bluegrass under field conditions.

TABLE II

| Compound (Lb/A) | | Kentucky Bluegrass % Kill | % Injury Remaining Plants |
|---|---|---|---|
| Linuron | 1 | 0 | 0 |
|  | 2 | 8 | 8 |
| Diuron | 0.5 | 31 | 23 |
|  | 1 | 81 | 41 |
|  | 2 | 98 | 92 |

The Table shows complete tolerance of Kentucky bluegrass to linuron from foliar spray applications at 1 lb/A while diuron applications at the same rate resulted in greater than 80% plant kill. A comparison of the tolerance differential between linuron and diuron at 2 lb/A rate likewise shows a significant difference in tolerance levels.

EXAMPLE 3

To further compare the tolerance differential resulting from field versus greenhouse applications of linuron, liquid treatments were directed to plant root systems to identify activity via this mode of chemical uptake. Sprays were prepared as in Example 1. Following application to mature plant species, all material was immediately flushed from the foliage into the root zone with water spray. Linuron is reported in the "Herbicide Handbook of the Weed Society of America," 1970, pg. 169, to be most readily absorbed through the root system; less absorption occurring through foliage and stems. Table III shows a comparison of soil (liquid drench) treatments of linuron, diuron and monuron on Kentucky bluegrass and selected weed species under field conditions.

TABLE III

| Compound | (Lb/A) | Kentucky Bluegrass | % Kill Dandelion | Plantain | K-31 Fescue |
|---|---|---|---|---|---|
| Linuron | 2.5 | 0 | 100 | 13 | 13 |
|  | 5 | 0 | 100 | 100 | 100 |
|  | 10 | 0 | 100 | 95 | 75 |
| Diuron | 2.5 | 55 | 100 | 10 | 100 |
|  | 5 | 85 | 100 | 43 | 100 |
|  | 10 | 100 | 100 | 88 | 100 |
| Monuron | 2.5 | 0 | 0 | 0 | 63 |
|  | 5 | 33 | 33 | 33 | 95 |
|  | 10 | 98 | 100 | 98 | 100 |

Post-emergence soil applications surprisingly resulted in complete tolerance of Kentucky bluegrass to linuron at the 2.5, 5 and 10 lb/A rates. With the exception of the low rate of monuron, all other diuron and monuron treatments resulted in moderate to high levels of toxicity to Kentucky bluegrass. Effectiveness of linuron, diuron, and monuron on dicot and monocot weeds varied with rates of application. Linuron and diuron were generally more effective at lower rates of application.

EXAMPLE 4

To further examine linuron's selectivity, both pre-emergence and post-emergence spray applications were made to Kentucky bluegrass under field conditions. Table IV compares pre-emergence and post-emergence liquid spray applications of linuron on Kentucky bluegrass under field conditions.

TABLE IV

| Compound (Lb/A) | | Kentucky Bluegrass % Kill Pre-emergence | Post-emergence |
|---|---|---|---|
| Linuron | 5 | 100 | 0 |
|  | 10 | 100 | 0 |

Pre-emergence treatments resulted in complete phytotoxicity to the young Kentucky bluegrass seedlings, while mature plants were tolerant to post-emergence applications. This example further isolates the tolerance of Kentucky bluegrass to the post-emergence linuron application sequence.

EXAMPLE 5

To further examine linuron's selectivity and activity characteristics, a study was conducted comparing liquid spray and granular treatments to moist foliage in established field plots. The granular formulations were prepared by mixing linuron with a vermiculate carrier to produce a 3 lb/A formulation. The formulation contained, for each 10,000 square feet of area, the following ingredients: linuron - 313 grams (as "Lorox" - a trademark for a wettable powder containing 50% linuron - 50% inert ingredients), a polybutene polymer as a sticking agent (the polybutene polymer was "Polyvis OSH," having a specific gravity at 65, a viscosity at 100°F of 150 and a 210°F of 42) and 4800 cu. in. of vermiculite.

Table V compares spray and granular applications of linuron on annual and Kentucky bluegrass under field conditions.

TABLE V

| Compound | Rate (Lb/A) | % Kill Kentucky Bluegrass | Annual Bluegrass |
|---|---|---|---|
| Linuron (spray) | 1 | 0 | 40 |
|  | 2 | 0 | 71 |
| Linuron (granular) | 1 | 0 | 3 |
|  | 2 | 0 | 23 |
|  | 3 | 0 | 86 |

Applications of liquid sprays at 1 and 2 lb/A and granulars at 1, 2 and 3 lbs/A showed complete Kentucky bluegrass tolerance; similar applications to annual bluegrass demonstrated moderately high levels of control at 2 lb/A liquid and 3 lb/A granular. Tolerance and activity characteristics therefore do not appear dependent upon the type of chemical carrier.

EXAMPLE 6

This example was carried out to further examine the foliar spray selectivity of linuron to Kentucky bluegrass and its corresponding effectiveness on annual bluegrass in field applications. Additionally, the effectiveness of post-emergence foliar spray applications for the control of crabgrass, nimblewill and bentgrass at 6 lb/A rate was examined. Table VI shows the activity of post-emergence foliar spray applications of linuron to annual and Kentucky bluegrass and selected monocot species under field conditions.

nual bluegrass and tolerance of Kentucky bluegrass under field conditions. Table VIII shows the response

TABLE VI

| | | | % Kill | | | |
|---|---|---|---|---|---|---|
| Compound | Rate (Lb/A) | Kentucky Bluegrass | Annual Bluegrass | Bentgrass | Crabgrass | K-31 Fescue | Nimblewill |
| Linuron | 6 | 0 | 88 | 73 | 100 | 20 | 100 |
| | 12 | 0 | 100 | 100 | 100 | 68 | 100 |

Table VI shows that linuron selectively controls annual bluegrass, crabgrass and nimblewill and, in addition, shows a moderately high control of bentgrass in post-emergence applications.

of granular post-emergence linuron treatments (soil applied) to Kentucky bluegrass, annual bluegrass and selected dicot species under field conditions.

TABLE VIII

| | | | % Kill | | | |
|---|---|---|---|---|---|---|
| Compound | Rate (Lb/A) | Kentucky Bluegrass | Poa annua | Plantain | Clover | Dandelion | Pigweed |
| Linuron | 0.5 | 0 | 0 | 50 | 50 | 50 | 50 |
| | 1 | 0 | 0 | 70 | 53 | 83 |
| | 2 | 0 | 98 | 93 | 100 | 100 | 100 |

EXAMPLE 7

This example shows the effect of pre-emergence granular linuron treatments, prepared as in Example 5, to germinating Kentucky bluegrass and respective tolerance to established Kentucky bluegrass turf. Table VII records the response of pre-emergence granular linuron applications on Kentucky bluegrass and selected dicot weed species.

The effectiveness of soil applied linuron to established dicot indicators buckhorn plantain, clover, dandelion and pigweed are shown in Table VIII. The 2 lb/A rate was sufficient to effectively control annual bluegrass and all dicot species tested.

EXAMPLE 9

This example compares the activity of linuron with that of three related urea compounds within the scope of the invention: chlorbromuron, metobromuron and

TABLE VII

| | | Turf | | % Kill seedings | | | |
|---|---|---|---|---|---|---|---|
| Compound | Rate (Lb/A) | Kentucky Bluegrass | Kentucky Bluegrass | Pigweed | Plantain | Clover | Dandelion |
| Linuron | 0.5 | 0 | 83 | 90 | 65 | 98 | 100 |
| | 1 | 0 | 90 | 100 | 95 | 100 | 100 |
| | 2 | 15 | 100 | 100 | 100 | 100 | 100 |

Table VII indicates that pre-emergence rates of 0.5 lb/A resulted in high levels of control of pigweed, clover and dandelion, buckhorn plantain was effectively controlled at 1 lb/A rate. Linuron was, however, toxic to Kentucky bluegrass seedlings.

EXAMPLE 8

This example demonstrates the activity of soil applied granular linuron, prepared as in Example 5, to anchloroxuron. The structure of these compounds are as follows:

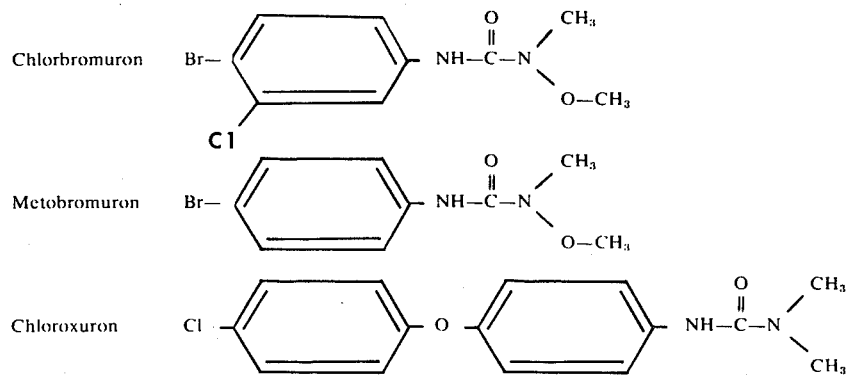

Table IX shows a comparison of soil application, applied as in Example 3, of linuron, chlorbromuron, metobromuron and chloroxuron to Kentucky bluegrass, annual bluegrass and selected monocot and dicot species under field conditions.

TABLE IX

| Compound | (Lb/A) | Turf Kentucky Bluegrass | Annual Bluegrass | % Kill Seedling Dandelion | Plantain | K-31 Fescue |
|---|---|---|---|---|---|---|
| Linuron | 2.5 | 0 | 50 | 80 | 25 | 45 |
|  | 5 | 0 | 75 | 90 | 75 | 70 |
|  | 10 | 0 | 93 | 93 | 88 | 98 |
| Chlorbrom- | 2.5 | 0 | 20 | 25 | 5 | 15 |
| uron | 5 | 0 | 75 | 100 | 88 | 80 |
|  | 10 | 0 | 100 | 98 | 98 | 100 |
| Metobro- | 2.5 | 0 | 5 | 40 | 15 | 0 |
| muron | 5 | 0 | 80 | 87 | 25 | 40 |
|  | 10 | 5 | 98 | 100 | 85 | 90 |
| Chlorox- | 2.5 | 0 | 45 | 0 | 0 | 0 |
| uron | 5 | 0 | 98 | 0 | 0 | 43 |
|  | 10 | 0 | 100 | 0 | 0 | 45 |

All materials were soil applied in field environment to mature Kentucky bluegrass sod and seedling monocot and dicot weed species. Chemical absorption via the plant root systems was observed with high selectivity to Kentucky bluegrass resulting. Control of all weed species tested ranked high with rates of 5 and 10 lbs/A of chlorbromuron and metobromuron. Chloroxuron produced high control levels of annual bluegrass only; effective rates were 5 and 10 lbs/A.

EXAMPLE 10

This example illustrates the activity of post-emergence foliar spray applications of linuron, chlorbromuron and metobromuron applied to mature Kentucky bluegrass, annual bluegrass, nimblewill and crabgrass species.

TABLE X

| Compound | Rate (Lb/A) | Kentucky Bluegrass | Annual Bluegrass | Nimble-will | Crab-grass |
|---|---|---|---|---|---|
| Linuron | 6 | 0 | 88 | 100 | 100 |
|  | 12 | 0 | 100 | 100 | 100 |
| Chlorbro- | 6 | 0 | 92 | 98 | 88 |
| muron | 12 | 0 | 95 | 100 | 99 |
| Metobrom- | 6 | 0 | — | 97 | — |
| uron | 12 | 0 | — | 100 | — |

Chlorbromuron applications at 6 and 12 lbs/A resulted in activity/tolerance responses very similar to that of linuron; Kentucky bluegrass was unaffected at either rate while excellent control of annual bluegrass, nimblewill and crabgrass resulted at both 6 and 12 lbs/A rates. Metobromuron applied to Kentucky bluegrass and annual bluegrass at 6 and 12 lbs/A also resulted in tolerance and effectiveness patterns very similar to that of linuron.

EXAMPLE 11

This example shows the activity of post-emergence granular applications of linuron and chlorbromuron applied to mature Kentucky bluegrass and bentgrass under field conditions. The linuron and chlorobromuron were prepared by mixing with vermiculite, as in Example 5, to produce a 2 lb/A formulation.

TABLE XI

| Compound | Rate (Lb/A) | Kentucky Bluegrass | Bentgrass |
|---|---|---|---|
| Linuron | 6 | 0 | 65 |
|  | 12 | 0 | 95 |
| Chlorbrom- | 6 | 0 | 8 |

TABLE XI-continued

| Compound | Rate (Lb/A) | Kentucky Bluegrass | Bentgrass |
|---|---|---|---|
| uron | 12 | 0 | 90 |

As shown in the above results, both formulations resulted in complete Kentucky bluegrass tolerance at 6 and 12 lbs/A, and effective bentgrass control at the 12 lbs/A rate. Selective bentgrass control in established Kentucky bluegrass turf is therefore possible with either formulation.

The compounds of the invention can be formulated as a liquid and applied as a spray or drench, or formulated as a granule or dust by placing on a dry carrier. Appropriate dry carriers include vermiculite, processed organic refuse, rice hulls, attapulgite clay, corn cob and fertilizer. Other carriers are described in "Handbook of Dust Diluents and Carriers" (2nd Ed.), 1955. U.S. Pat. Nos. 3,076,699 and 3,083,089 disclose methods for making granular formulations which may be used with the compounds of the present invention. For example, those compounds which are solids at room temperature may be dissolved in an appropriate solvent and adhered to a carrier in the manner disclosed in U.S. Pat. No. 3,083,089. Or particles of the compound may be adhered to a carrier with a suitable sticking agent as described in U.S. Pat. No. 3,076,699. Those compounds which are liquids can be similarly absorbed on exfoliated vermiculite as described in the foregoing patents.

Diluents, stabilizers, sticking agents, solvents, plant nutrients, other herbicides, flow enhancing agents, adhesives, dyes, and other adjuvants may also be employed in formulations in which the compounds of the present invention are incorporated. The above mentioned and other adjuvants which may be employed are described in "Weed Control" (2nd Ed.), Robbins et al, McGraw-Hill Book Company, Inc., New York, N.Y., 1952, and in U.S. Pat. No. 3,231,363, issued Jan. 25, 1966, to Victor A. Renner for PROCESS FOR MAKING FOAMED UREA-FORMALDEHYDE FERTILIZER, and U.S. Pat. No. 3,705,794, issued Dec. 12, 1972 for FOAMED FERTILIZERS AND COMBINATION PRODUCTS which disclose various combination products in which the compounds disclosed herein may be incorporated and method of preparing such formulations.

I claim:

1. A process for the selective control of weeds in mature Kentucky bluegrass turf comprising treating said turf with a compound of the formula

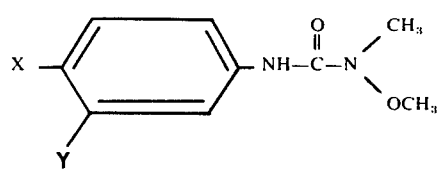

wherein X is selected from the group consisting of chlorine and bromine and Y is selected from the group consisting of chlorine, bromine and hydrogen, with the proviso that X and Y are not simultaneously bromine, in an amount effective to kill said weeds but insufficient to damage said Kentucky bluegrass.

2. A process of claim 1 in which the weeds are annual bluegrass.

3. The process of claim 1 in which the amount of compound is from ½ to 12 pounds per acre.

4. The process of claim 1 in which the compound is

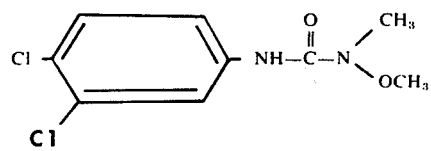

5. The process of claim 1 in which the compound is

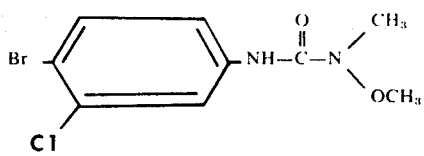

6. The process of claim 1 in which the compound is

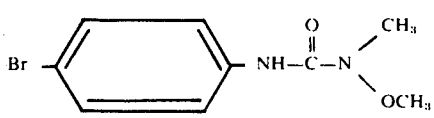

7. The process for the selective post-emergence control of annual bluegrass in mature Kentucky bluegrass turf comprising treating said turf with the compound

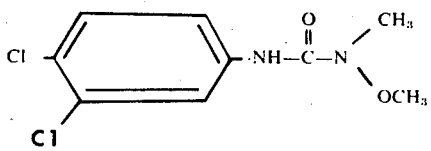

in an amount of from ½ to 12 pounds per acre sufficient to kill said annual bluegrass but insufficient to damage said turf.

8. The process of claim 7 in which the amount of said compound is from 1 to 8 pounds per acre.

* * * * *